Aug. 16, 1938.  C. BREER  2,127,323

VEHICLE BODY ELEMENT

Filed March 6, 1936

INVENTOR
CARL BREER.
BY Harness, Dind, Patee & Harris.
ATTORNEY

Patented Aug. 16, 1938

2,127,323

UNITED STATES PATENT OFFICE 2,127,323

VEHICLE BODY ELEMENT

Carl Breer, Grosse Pointe Park, Mich., assignor to Chrysler Corporation, Highland Park, Mich., a corporation of Delaware Application March 6, 1936, Serial No. 67,423

1 Claim. (Cl. 180—77)

This invention relates to vehicle bodies and more particularly to improvements in safety features therefor.

An object of the invention is to reduce the possibilities of injuries to passengers resulting from forceful contact with portions of the vehicle body and more especially to provide protection against contact with body parts presenting sharp, hard or protruding surfaces of relatively small area which are either fixed or which do not yield under impact.

In the construction of vehicle bodies and more especially the forwardly disposed portions thereof which are in advance of the occupants, it has been found expedient to provide various readily accessible operating levers or handles. These levers or handles are generally so positioned that sudden and unexpected change in the movement of the vehicle, particularly stopping thereof, has frequently resulted in the passenger being forceably thrown into contact with such protruding parts, which, because of their small surface area, apply high unit pressure on localized areas of the passenger's head, face, or other contacting parts. The exigencies of this situation have become more pronounced with the increase in operating speeds, heavy traffic and effectiveness of braking mechanisms to produce stopping in a relatively short distance.

A further object of the invention is to provide in a vehicle body having a seat disposed adjacent to portions thereof equipped with operating accessories, improved operating members which will cushion contact therewith and which will yield within appreciable limits in response to the application of force.

Another object of the invention is the provision of improved operating knobs comprising a resilient, yieldable material and having a substantial portion thereof so constructed and arranged as to provide a protecting cushion for the end portion of the associated arm or lever.

Other objects and advantages of the invention will be more apparent from the following description taken in connection with the accompanying drawing, in which.

Figure 1:
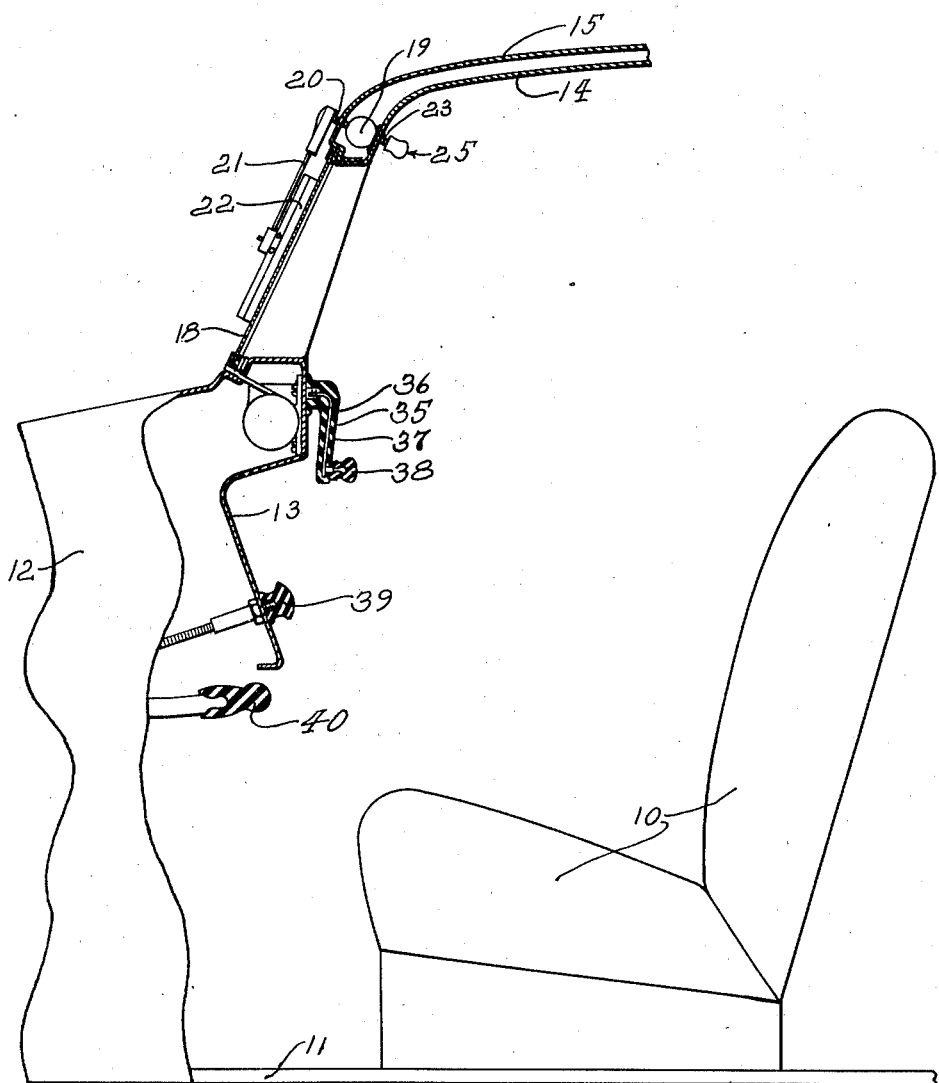
Fig. 1 is a fragmentary side elevational view, partly in section, of a vehicle body illustrating an embodiment of the invention.

The invention is illustrated and described in connection with the front seat or operator's compartment of a vehicle body wherein it has especial significance although it will be understood that the invention is equally adaptable for embodiment in other locations, particularly where it is desirable to afford protection against sharp or hard protruding surfaces.

Referring to the drawing, there is illustrated a fragmentary frontal portion of a vehicle body having a passenger compartment in which is disposed a seat structure 10 mounted on a floor 11. Spaced forwardly of the seat 10 is a cowl 12 having an integral inward extension provided with a generally downwardly extending projection 13 affording a suitable mounting for various levers or handles operatively connected with various mechanism of the vehicle. The body has a top structure including spaced inner and outer members 14 and 15, respectively, the extremities of which are flanged inwardly into overlapping relationship. The space between the cowl and the top structure is closed by the conventional windshield including a glass panel 18 movable outwardly relative to the cowl 12.

Positioned between the members 14 and 15 of the top structure is a motor 19 for actuating a cleaning mechanism for a portion of the glass panel 18. This mechanism includes an arm 20 oscillatable by the motor 19, the arm 20 having attached thereto a rod 21 carrying a wiper 22 contacting the outer surface of the glass panel 18. The motor 19 has a control arm 23, a portion of which projects through an aperture in the top member 14 interiorally of the passenger compartment. The end portion of the arm 23 has a reduced diameter, providing a shoulder 24, and the latter portion is threaded for engagement with a suitable hand knob as hereinafter set forth.

It is customary in the construction of vehicle bodies to arrange mechanism as heretofore described immediately in front of the operator's seat for the purpose of insuring unobstructed vision. If desired, similar mechanism may be installed at the opposite side of the frontal end of the vehicle for the benefit of the passenger occupying the seat adjacent the operator. It has been found expedient to locate the control for the motor or motors 19 so that they will be readily accessible. However, the position of the control arm or arms 23 is such that sudden or unexpected stopping of the vehicle has a pronounced tendency to throw the passengers forwardly and when this occurs injury frequently results from contact with the control arms positioned immediately forward of the seat. In order to minimize the possibilities of injuries resulting from such contact, I have provided a hand knob on the extremity of these arms which project into the passenger compartment. These knobs are formed of relatively soft material, preferably rubber having a durometer hardness, as determined by accepted tests, of between 57 and 63 units after vulcanization, although the particular degree of hardness may be somewhat varied according to requirements.

Figure 2:
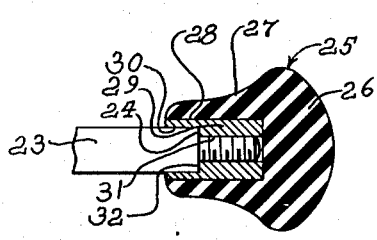
Fig. 2 is an enlarged sectional view illustrating a control lever equipped with a knob embodying the invention.

Referring to Fig. 2, I have illustrated a knob, generally designated by the numeral 25 applied to the control arm 23 for the motor 19. This knob is made of relatively soft rubber and has an enlarged end portion 26 and a tapered projection 27 in which is formed an axially extending recess 28. A metallic insert 29, preferably of brass or provided with an exterior coating of brass, is received in the recess 28 for attaching the knob to the control arm 23. The insert 29 is bonded, preferably by vulcanization, to the adjacent wall surfaces of the recess. A counterbore 30 and an internally threaded bore 31 are formed in the insert, this formation providing a shoulder 32. When the knob 25 is assembled on the rod 23 the reduced portion thereof is threaded into the bore 31 of the insert 29, the counterbore 30 receiving and supporting a portion of the rod, and the shoulder 24 of the latter abutting the shoulder 32 of the insert.

The contour of the knob not only provides a suitable grip for the operator but the enlarged end 26 presents a substantial area and thickness of rubber at the inwardly disposed end of the rod 23, thus affording cushioning protection for the passengers against contact with a fixed metallic projection.

As a further means for improving the safety of the vehicle, the handle 35 for operation of the windshield glass panel 18 may comprise a metallic insert 36 embedded in relatively soft rubber 37 and on which is mounted a knob 38 similar to the knob 25. Other control members, such as the knob 39 for the engine choke and the cowl ventilator control arm 40, may be provided with knobs of relatively soft rubber as heretofore set forth.

In this specification and in the attendant claim the expression "control knob" refers to the projecting portion of the actuating element by which various devices such as windshield wiper, windshield operator, choke rod and cowl ventilator operator are controlled.

What I claim is:

In a driver's compartment in an automobile, a supporting panel, a control element mounted on said supporting panel and comprising a control knob projecting from the surface of said supporting panel, said control knob comprising a relatively thick outer wall composed of soft cushioning material, whereby to afford protection to occupants of said compartment if thrown against said control knob.

CARL BREER.